United States Patent [19]
Zilberberg

[11] Patent Number: 5,747,888
[45] Date of Patent: May 5, 1998

[54] BACK UP SYSTEM FOR THE SUPPLY OF VOLTAGE IN TELEVISION CABLE SYSTEMS

[76] Inventor: David Zilberberg, 11a Pataistreet, Tel-Aviv 69973, Israel

[21] Appl. No.: 898,969

[22] Filed: Jul. 23, 1997

Related U.S. Application Data

[63] Continuation of Ser. No. 543,942, Oct. 17, 1995, abandoned.

[30] Foreign Application Priority Data

Oct. 18, 1995 [IL] Israel ......................... 111321

[51] Int. Cl.$^6$ ..................................... H04H 7/00
[52] U.S. Cl. .................. 307/66; 307/64; 348/6; 348/8; 455/67.1; 455/115
[58] Field of Search ................. 307/64, 66; 348/6, 348/8; 455/115, 67.1

[56] References Cited

U.S. PATENT DOCUMENTS

| | | | |
|---|---|---|---|
| 3,818,272 | 6/1974 | Rich | 307/66 |
| 3,860,748 | 1/1975 | Everhart et al. | 348/6 |
| 3,909,560 | 9/1975 | Martin . | |
| 4,362,951 | 12/1982 | Turner et al. | 307/66 |
| 4,412,245 | 10/1983 | Kwok . | |
| 4,558,358 | 12/1985 | Onda | 455/67.1 |
| 4,741,048 | 4/1988 | Mori . | |
| 5,020,134 | 5/1991 | Pecault | 455/115 |
| 5,434,610 | 7/1995 | Loveless . | |

FOREIGN PATENT DOCUMENTS

| | | |
|---|---|---|
| 6114898 | 5/1988 | Japan . |
| 4213986 | 5/1992 | Japan . |
| 4217190 | 7/1992 | Japan . |

*Primary Examiner*—Richard T. Elms
*Assistant Examiner*—Albert W. Paladini
*Attorney, Agent, or Firm*—Emrich & Dithmar

[57] ABSTRACT

A back-up system for the supply of electric voltage to the main trunk and secondary amplifier located within a television cable system when an electric fault in the electric supply occurs includes switching members in the system. The switching members may be a relay, a triak or a transistor which are automatically actuated when an electric fault occurs which cause a change of direction of the supply of electricity to the cable system. The switching members may be located within the trunk and may be connected to an in/out supply socket, to a fuse terminal or to a voltage supply selecting socket.

21 Claims, 11 Drawing Sheets

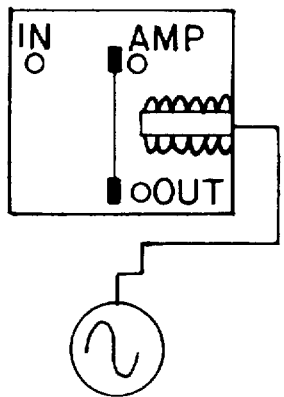
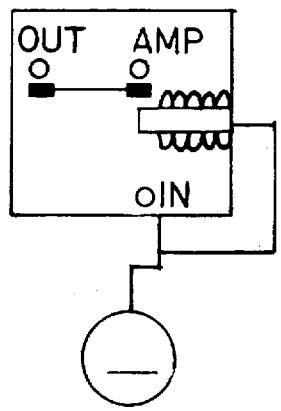
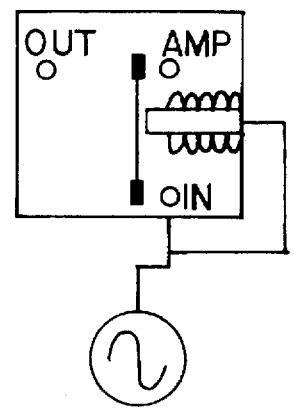
FIG. 2C          FIG. 2B          FIG. 2A
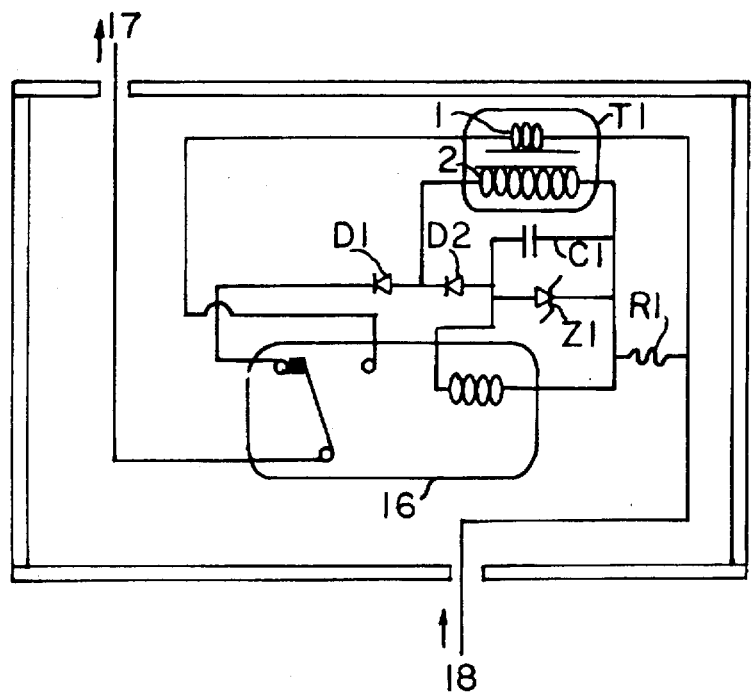
FIG. 3A

OFF POSITION　　ON POSITION

BACK UP SYSTEM FOR THE SUPPLY OF VOLTAGE IN TELEVISION CABLE SYSTEMS

This is a continuation of application Ser. No. 543,942 filed Oct. 17, 1995, now abandoned.

The present invention relates to a back-up system for the supply of electric voltage to main and secondary amplifiers in television cable systems in case of an electricity fault.

There is known such a system—the so-called U.P.S. system. Said system supplies alternating feeding voltage when no electricity is supplied. The alternating voltage is produced from a number of accumulators and from a cycle converting DC voltage to AC voltage.

However the U.P.S. system has many drawbacks. The back-up time is rather restricted, i.e. about 2–3 hours, it has a rather low reliability, and it requires an expensive maintenance and high investment costs.

It has thus been desirable to design a back-up system, which would overcome the above disadvantages, i.e. should have a rather unlimited back-up time, should be reliable, not require expensive maintenance and rather low investment costs. It should also be easy in its operation and be suitable to be used in all commercially available cable television systems.

The usual television cable system comprises main lines (called "trunk" lines) each one extending from the television station. Each trunk line consists of a cable connecting several main or trunk amplifiers (called "trunks") arranged in a so called cascade manner. Each trunk amplifies the signals coming from the station towards the next trunk. Moreover, each trunk transfers said signals to secondary amplifiers lex (line extender), if any, branched out of it. Voltage is supplied to the trunk and to the lex by an electric source being located near the trunk and feeding the trunk. The voltage is suitably supplied via a local power insert (L.P.I.). The electric source is preferably the general electric net from which the voltage is transformed by a transformer to the required voltage. The lex, if any, is supplied with voltage, preferably of 50–68 V, by a voltage bridge via co-axial cables extending from the trunk to the branches of lexes. The above system will be called herein a "television cable system".

The trunks in this systems are located about 500–900 m from each other. The electric source is located about 2 to 35 m from the appropriate trunk.

The present invention thus consists in an one way back-up system for the supply of electric voltage to main and secondary amplifiers in television cable systems in case of electricity faults, in which each trunk comprises switching means or redirect power unit, said switching means being actuated when an electricity fault occurs causing change of direction of the electricity supply.

The switching means are automatically actuated in case that there occurs a fault of electricity in one of the electric sources supplying electric current to the trunk. When the electricity fault occurs voltage is switched on the main line between two amplifiers. This is preferably achieved by inserting an additional fuse to the L.P.I. The L.P.I. may then supply feeding voltage to the near trunk and back-up voltage to the previous or following trunk of the cascade.

The switching means may be a relay; an element switching current by voltage or outer current (called "triac" which may be composed of 2 (SCR) units); a transistor; etc.

The preferred switching means is an AC relay working preferably on 48–68 V. The advantage of using an AC relay is that the voltage is constant and there is no difference between the "in" and the "out" voltage. However, if required, a DC relay connected to a diode bridge may also be used. The present invention will be illustrated herein especially with reference to switching means being an AC relay, however as is readily understood it is not restricted thereto.

The switching means are advantageously located within the trunk and connected to an in/out supply socket, to a fuse terminal (in case of a MAGNAVOX trunk) or to a voltage supply selecting socket (in case of a JERROLD trunk). It is readily understood that the present invention is not restricted to said trunks and that any other commercially available trunk may be used. The kind of connection depends on the switching means and to the kind of trunk amplifier being used. An additional switching means may be located within the trunk or be located thereto by a bridging cable.

There are, for example, three suitable systems to connect the switching means to the electric source, namely:

1. Normal "In" back up "Out" system. (System 1) In said system the local power supply is connected to the "In" side of the trunk amplifier and the back-up power is connected to the "Out" side of the trunk amplifier. (This system is not suitable if the fault occurs in the last trunk of the cascade. In this case it is necessary to use a 2-way back-up unit for backing-up the last trunk in the cascade. Such possibility will be described hereinafter). Should there be optical (OPT) receivers in the network it is possible to back-up the receiver and the secondary amplifier by connecting the switching means outside the receiver. In case that the cable network consists of OPT receivers only, it is possible to back-up the OPT receivers by external back-up units and to connect the back-up voltage by electric cables.

2. Normal "Out" back-up "In" system. (System 2) In said system the local power supply is connected to the "Out" of the trunk amplifier and the back-up is connected to the "In" side of the trunk amplifier. Thus, there is no need for a 2-way back-up unit for backing-up the last trunk in the cascade, although such a unit may be present.

3. Long distance back-up system. (System 3) Normal "BR" back-up main line. In said system the local power supply is connected via the bridger (one of the 4 exits) to the secondary amplifier and trunk amplifier. The back-up power is originating from the main power line. In case of electricity faults in the local power supply, the trunk amplifier will be operated by the back-up voltage received from the main power line.

In this case no 2-way back up unit is present or required.

Sometimes it is desirable to increase the back-up possibility, in order to avoid over-load in systems 1 or 2, by an additional electricity source. This is suitably being done by connecting said additional electric source to an additional L.P.I being connected to the first L.P.I. Each L.P.I. has a fuse in opposite directions so that there is no connection between the voltages from both electric sources.

The AC relay is suitably built in such a manner that it is actuated by a voltage of 50 V. All the time that the voltage is above 50 V the relay is on "on", i.e. the voltage supplied originates from the original electric source. The moment the voltage is below 50 V the relay is on "off" and electricity is supplied from the back-up electric source and the trunk and the secondary amplifiers are fed by the back-up electric source. The moment the electric fault has been repaired the relay returns to the "on" position and voltage is supplied from the original electric source.

The relay may also be connected in the reverse direction and then it works from the last trunk of the cascade towards the first one.

In case that system 1 should also enable the back-up of the last trunk of the cascade the system is provided with 2 two-way back-up units, said units being located outside and between the last two trunks of the cascade, each unit being connected via an L.P.I to a separate trunk and to a separate electric source, said units operating in opposite directions one to another, each unit comprising an ignition circuit and a maintenance circuit.

The ignition circuit advantageously comprises a diode and a relay. The maintenance circuit advantageously comprises a transformer, diodes and a relay. The relay may be common to both circuits.

The L.P.I is advantageously a separate part. However, if desired, the two way back-up unit and the L.P.I. may be built as an integral part.

Usually said two-way back-up units are inserted only between the last two trunks of the cascade where they are necessary if the last trunk should be backed-up. However, should anybody be interested therein the two-way back-up units may in addition be inserted between two other or more trunks of the cascade.

The two-way back up unit operates as follows:

The moment there is an electricity fault in one trunk, the ignition circuit in the two-way back-up unit being connected to the adjoining trunk us ignited and the maintenance circuit of said unit is actuated, after a certain delay, e.g. about 1 sec. and then voltage is supplied to the trunk where the fault occurs. The moment no back-up voltage is required in said trunk the current stops to flow from the back- up unit, the maintenance circuit stops working and the ignition circuit is extincted.

The electric source is preferably one which, when no voltage is supplied from the general network to the inlet thereof, it is disconnected from the cable system. Otherwise a relay has to be inserted at the inlet of the two-way back-up unit.

The above two-way back-up unit can be utilised not only as part of system 1 of the present invention but also for other purposes. Thus it may be utilised for switching voltage when the customer uses above a certain wattage and the drop of said wattage below a certain minimum causes disconnection of electricity. Thus it may be used for an instrument protecting against electrification; for protecting electrical instruments, etc.

As indicated above the U.P.S. system commercially being used has many disadvantages. However, nevertheless it may be retained and the system according to the present invention may be used for backing-up said system.

The present invention will now be illustrated with reference to the accompanying drawings without being limited by them. Identical parts appearing in the same FIG. are usually referenced once. Identical parts appearing in several drawings are referenced by the same reference numeral. (FIGS. 1–4 refer to system 1; FIGS. 5 refer to system 2; FIGS. 6 refer to system 3; and FIGS. 7 and 8 refer to all systems.)

FIGS. 2a and 2b show a relay for the first trunks wherein the relay is in the "on" and "off" position, respectively;

FIG. 2c shows a relay for the last trunk wherein the relay is in the "open" position;

FIG. 3a shows an electrical circuit of a two-way back up unit;

FIG. 5a shows a block diagram of system 2 according to the present invention which operates in the opposite direction to that shown in FIG. 1a;

FIG. 5b shows a block diagram of the connection between a trunk and several lexes of the system shown in FIG. 5a;

FIG. 6b shows a block diagram of the connection between a trunk, several lexes and a local power supply of the system shown in FIG. 6a;

Figure 8A:
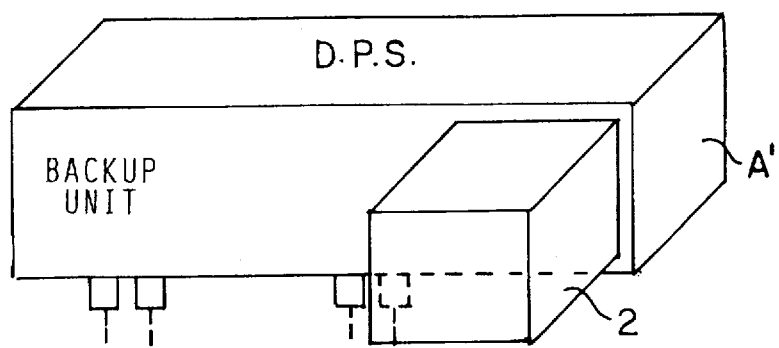
FIG. 8a shows an one way back-up unit for Magnavox trunks.
Figure 8B:
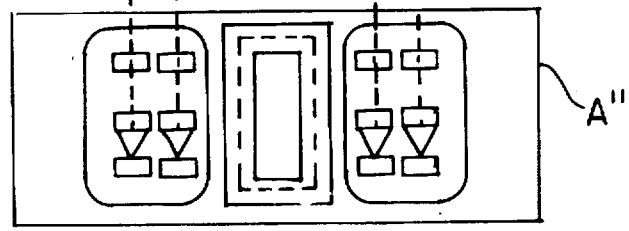

FIG. 8b a fuse socket for a MAGNAVOX trunk.

Figure 1A:
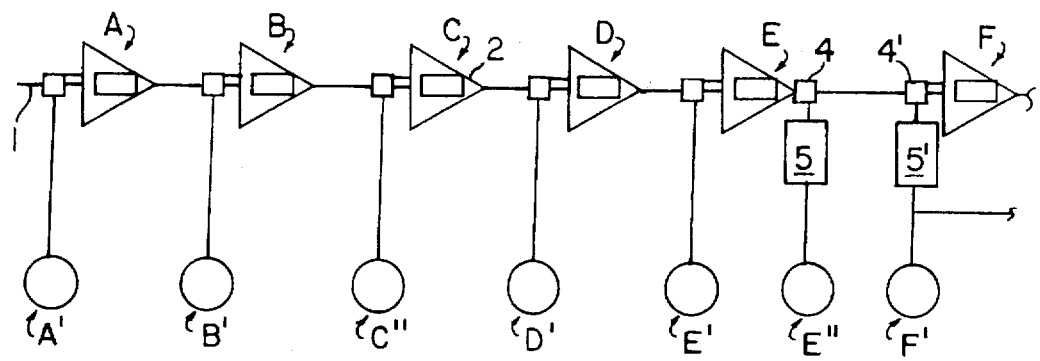
FIG. 1a shows a block diagram of system 1 according to the present invention.

The system shown in FIG. 1a comprises cable 1 originating in the television station (not shown) connecting trunks A, B, C, D, E and F in a cascade to each other. Each of said trunks comprise a relay 2. On cable 1 are mounted L.P.I. units 3 being connected to electric sources A' to E', respectively. The back-up units between trunks A to E are one-way back-up units. Between trunks E and F are mounted L.P.I. units 4 and 4' being connected via two-way back-up units 5 and 5' to electric sources E" and F', respectively. This constitutes a so-called two-way back up unit.

In case that an electricity fault occurs in one of trunks A to E relays 2 are actuated and electricity is supplied from the electric source following said trunk. When the fault occurs in trunk F electricity is supplied from electric source E".

Figure 1B:
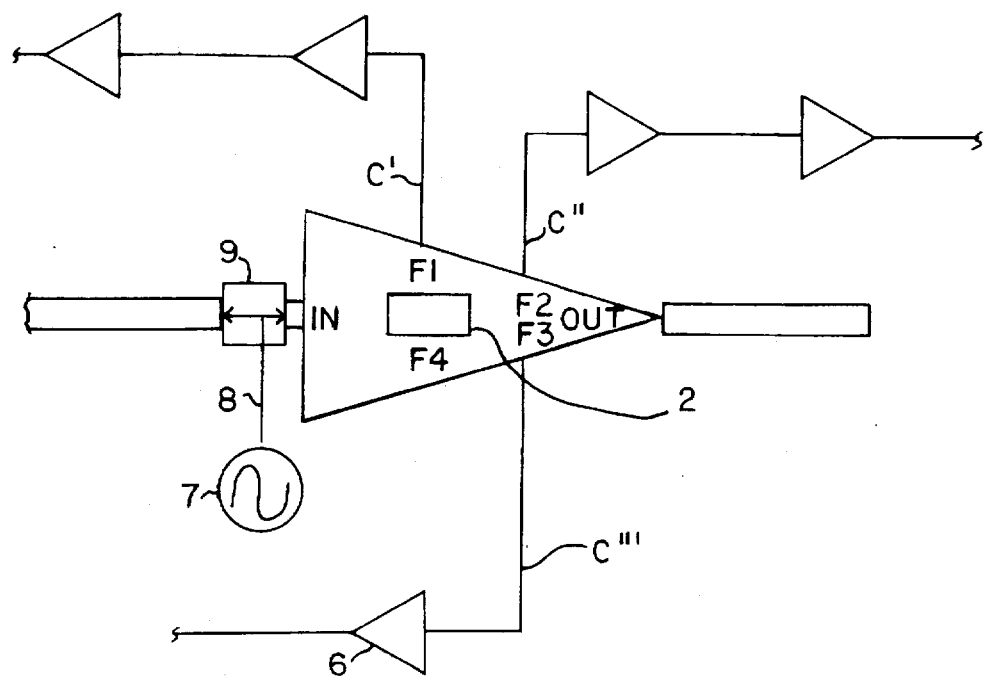
FIG. 1b shows a block diagram of the connection between a trunk and several lexes.

The system illustrated in FIG. 1b shows trunk B (by way of example only) comprising relay 2. Trunk B is connected via fuses F1, F2 and F3 by cables C', C" and C'", respectively, to lexes 6 (only one being referenced). Electric source 7 is connected by cable 8 to L.P.I. 9 which is in turn connected to relay 2 located in trunk B.

Figure 1C:
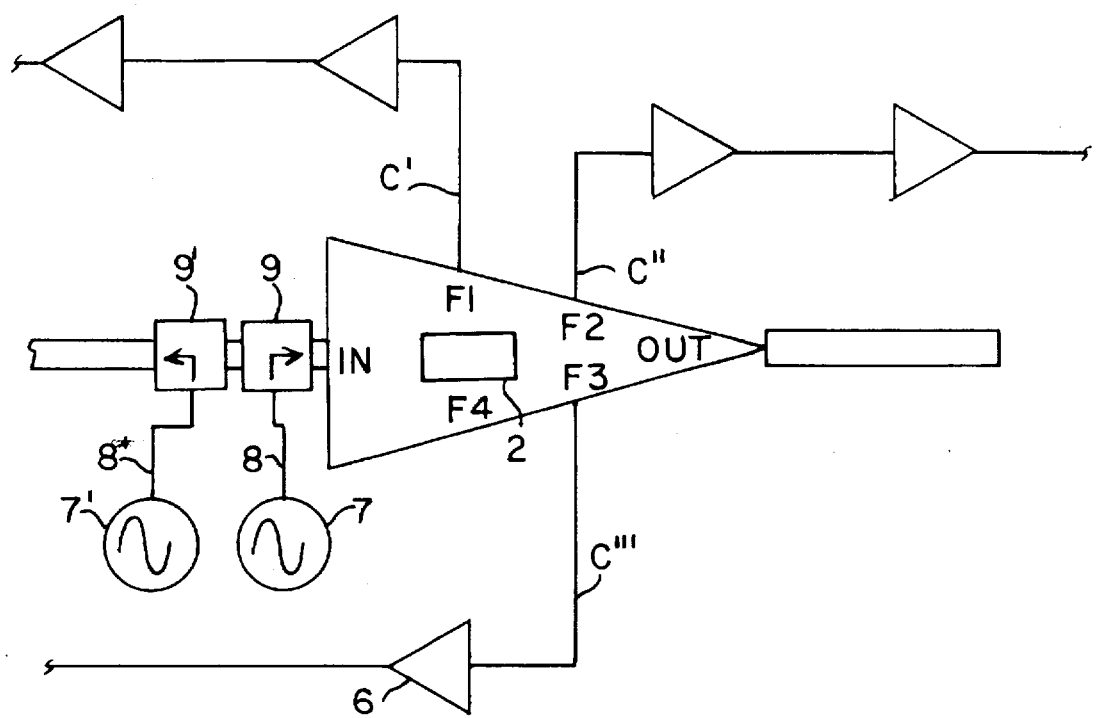
FIG. 1c shows a diagram as shown in FIG. 1b provided with two electric sources.

The system illustrated in FIG. 1c is the same as that shown in FIG. 1b with the addition of an additional electric source 7', line 8' and L.P.I. 9'. Electric source 7 supplies voltage to the adjoining trunk and electric source 7' supplies back-up voltage to the preceding trunk in the cascade.

Figure 1D:
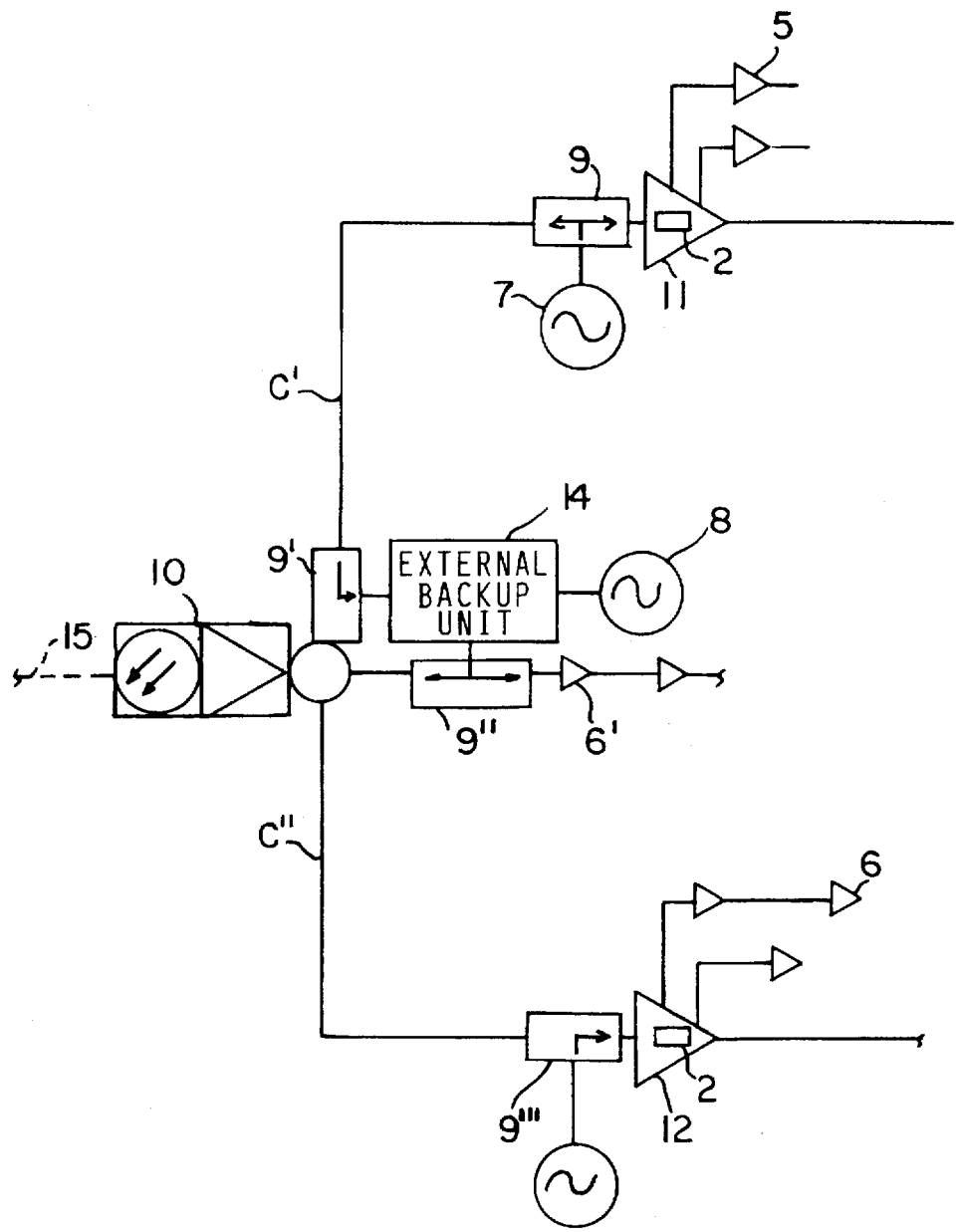
FIG. 1d shows a block diagram of the connection between an OPT receiver, 2 trunk amplifiers and several lexes.

The system illustrated in FIG. 1d shows OPT receiver 10 connected to several lexes 6' and connected by cables C' and C" to trunk amplifiers 11 and 12. Electric source 7 supplies normal power to trunk amplifier 11 including lexes 6 connected to a bridger. Electric source 7 supplies also back-up power to OPT receiver 10 and to all lexes 6' connected thereto. L.P.I 9 is connected by 2 fuses providing voltage to trunk amplifier 11 and back-up voltage to OPT receiver 10 and to all lexes 6' connected thereto. L.P.I. 9' is used for forwarding backup voltage to external back-up unit 14. L.P.I. 9" forwards power to OPT 10 and to all lexes 6' connected thereto. Electric source 7 is connected to external back-up unit 14 at the normal power input side. L.P.I. 9'. Is connected by one fuse to supply voltage to trunk 12 and lexes 6 connected thereto. Optic fiber 15 supplies signals to OPT receiver 10. In order to avoid overload in the course of the backup time. It is possible to add an additional electric source for backing-up only in the same manner as in FIG. 1c.

FIGS. 2a and 2b shows an one-way back-up unit for trunks A to E in on and off position, respectively. FIG. 2c shows the on position for an one-way back up unit for amplifier F, i.e. the last trunk in the cascade.

The two-way unit illustrated in FIG. 3a comprises:

DC relay 16 which may be in two positions. The relay transfers current upto 20 amp. Relay 16 is actuated by a minimum DC voltage of 20 V. It is actuated when there is voltage 0 connected to the earth by a co-axial cable that occurs after relay 2 has been actuated and the back—up power is not yet available. The outlet of relay 16 is connected to L.P.I. 4' or 4" by cable 17;

transformer T1 having a winding relation 1:700 (wire 1:wire 2), wire 1 having an 0.01 ohm resistance. This arrangement is made in order to avoid a voltage drop in the back-up operation. As long as there flows a current through wire 1 of transformer Ti there is present voltage in wire 2 which supplies voltage to relay 16. Transformer T1 receives voltage from electrical source 18;

diode D1 which avoids the flow of current between both back-up units in the off position;

diode 2 which rectifies AC voltage originating in transformer T1 in the course of the back-up operation in order to supply DC voltage to relay 16;

resistor R1 to avoid high voltage drop below the breakdown voltage of Zenar diode Z1 when relay 16 is in the off position and the far trunk requests a back-up;

diode Z1 to avoid high voltage of relay 16; and capacitor C1 which delays the ignition and extinction time of relay 16.

Figure 3B:
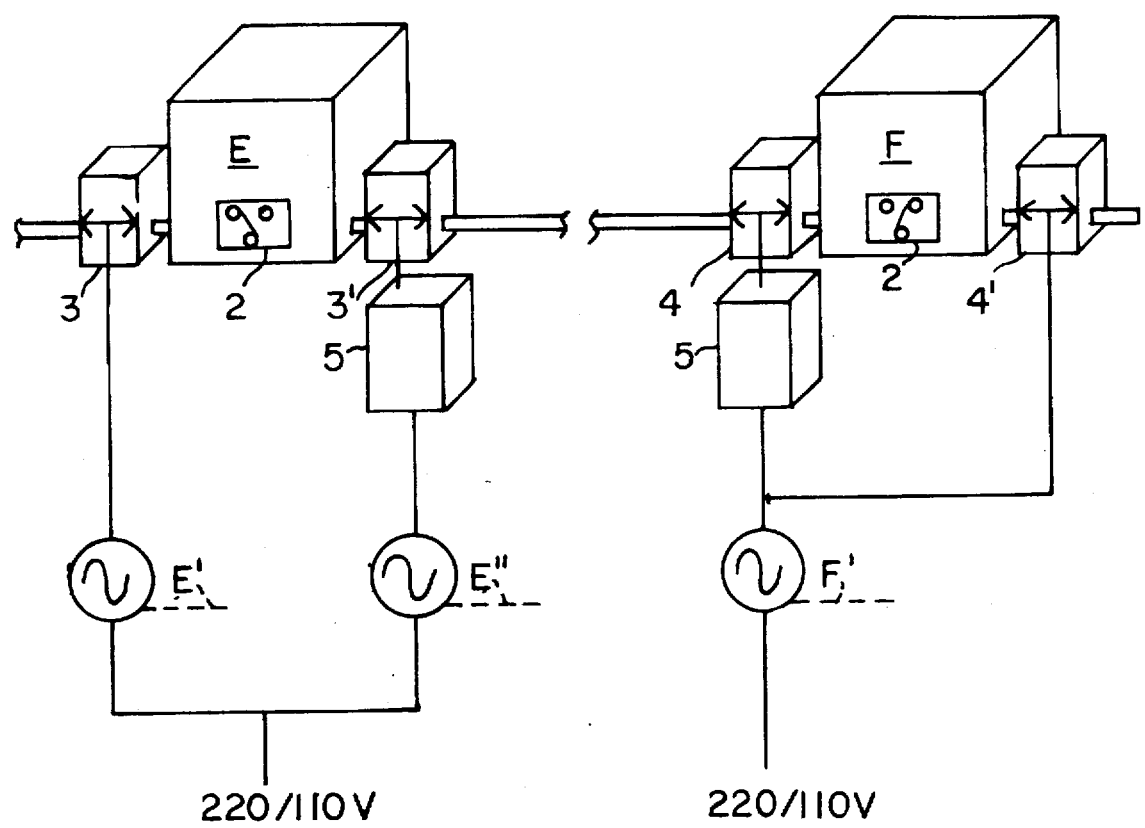
FIG. 3b shows in a schematical manner the connection between 2 adjoining trunks each being provided with a two-way back up unit.

FIG. 3b shows trunks E and F each comprising a relay 2. Trunk E is connected on one side via L.P.I 3 to electric source E' and on the other side via L.P.I. 3' and two-way back up unit 5 to electric source E". Trunk F is connected via L.P.I. 4', two-way back up-unit 5 to electrical source F'. When there occurs an electrical fault in trunk F the ignition circuit in unit 5 is ignited and provides voltage for a short time, e.g. 1 sec. When the current is above a pre-determined value, e.g.1 amp. the maintenance circuit in unit 5 is actuated. Thus, voltage is supplied to trunk F. When outside electricity returns to trunk F, relay 2 returns to "on" position and current terminates to flow in unit 5. The maintenance circuit does not operate any more and the ignition circuit is extincted.

Figure 4A:
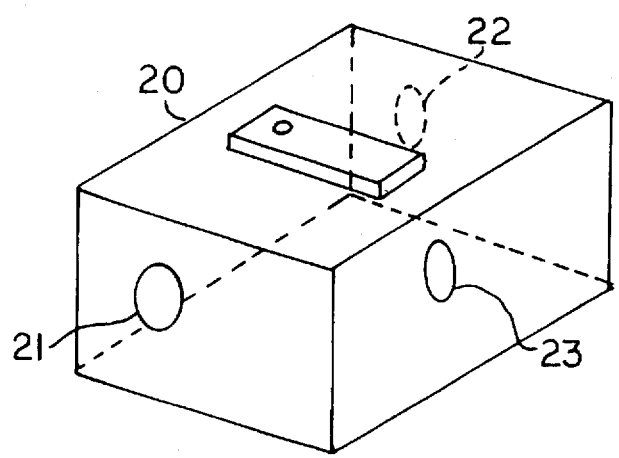
FIG. 4a shows the housing of an external back-up unit.
Figure 4B:
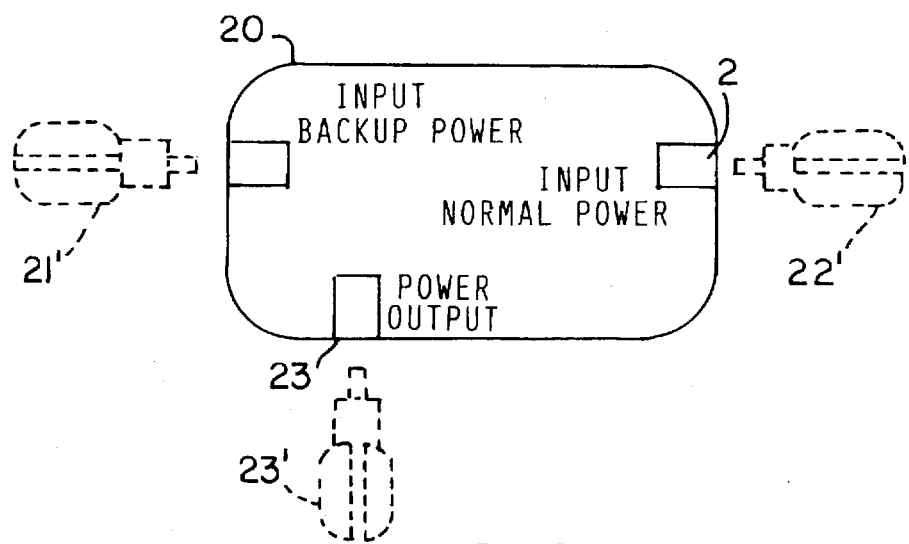
FIG. 4b shows the plug connection to the external back-up unit.
Figure 4C:
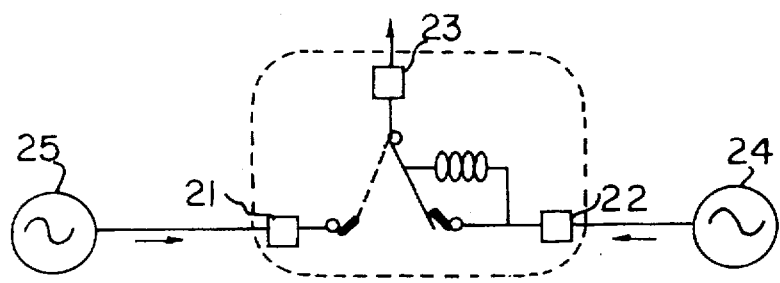
FIG. 4c shows the switching means in an external back up system.

As indicated above the back-up shown in FIGS. 4a–4c is an external back-up unit 14 used for backing-up OPT receiver 10.

FIG. 4a and 4b show housing 20 of external back-up unit 14. There are input sockets 21 and 22. Input socket 21 is for the back-up voltage and input socket 22 is for the voltage supplied by the local power supply. Output socket 23 is connected to a trunk amplifier and OPT via an additional L.P.I. (Not shown). Connectors 21', 22' and 23' indicate the manner in which external back-up unit 14 is connected to the network.

FIG. 4c indicates how the switching works between normal power source 24 and back-up power source 25.

Figure 5A:
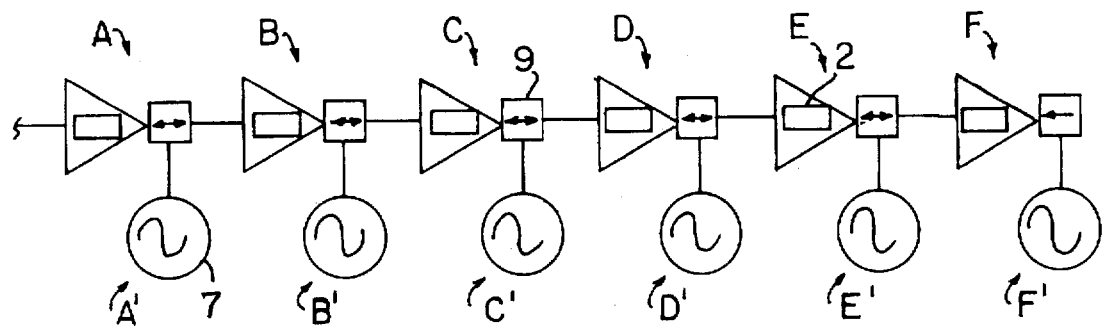

FIG. 5a shows cable 1 originating in a television station (not shown) connecting trunks A, B, C, D, E and F in cascade to each other. Each of said trunk comprises a relay 2. All L.P.I units 9 are connected to the Out position by 2 fuses directing the supply voltage into 2 directions (See FIG. 5b.) Electric sources A' to F' are connected to the general network via L.P.I. units 9.

Figure 5B:
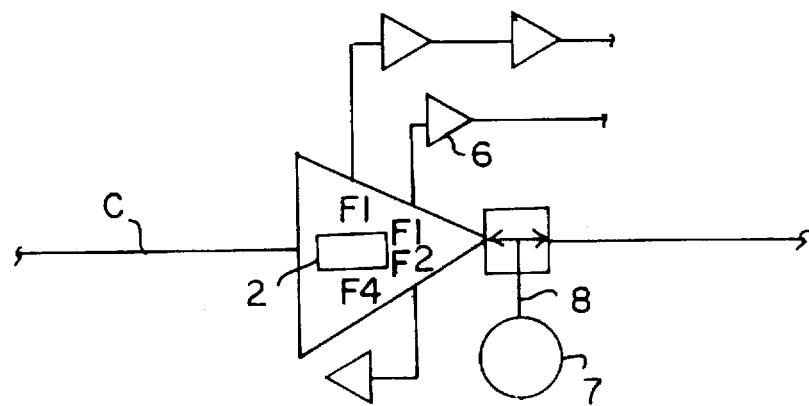

FIG. 5b shows trunk B (by way of example only comprising relay 2 as back-up unit (normal "Out" and back-up "In"). Lexes 6 are connected as shown in FIG. 1b. Electric source 7 is connected by cable 8 to L.P.I. 9 which is connected to the outside of trunk B.

Figure 5C:
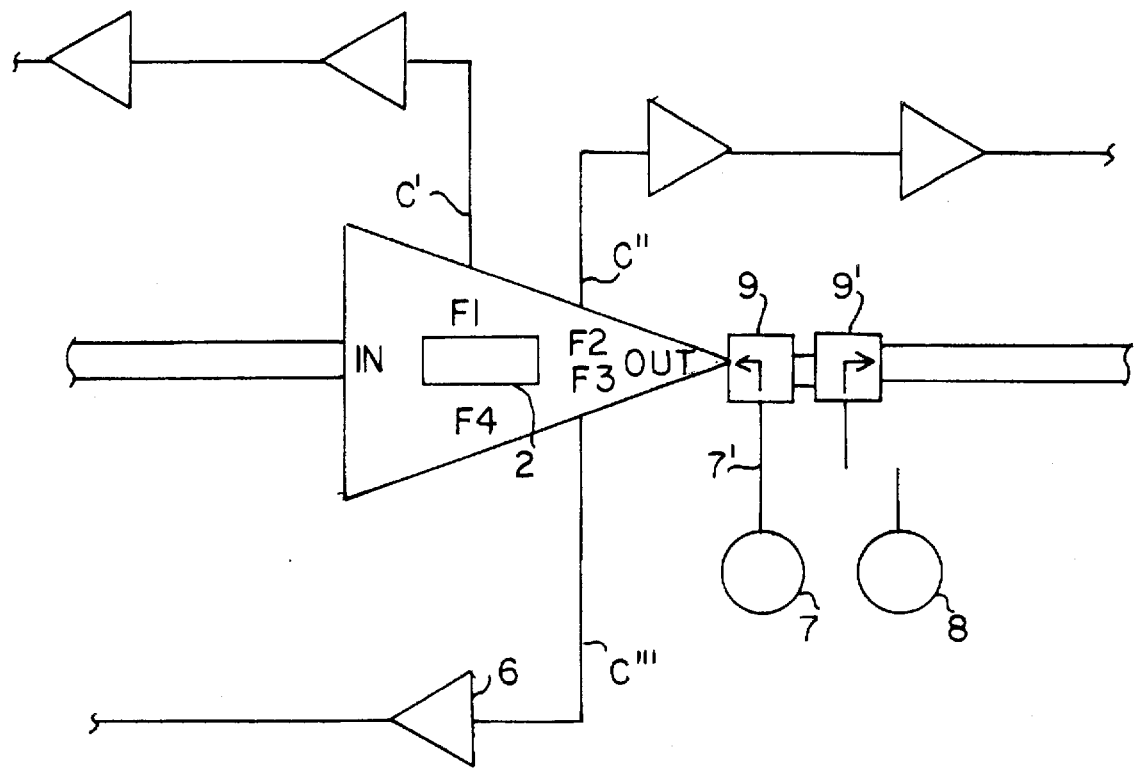
FIG. 5c shows a diagram as shown in FIG. 5b provided with two electric sources.

FIG. 5c shows the same system as shown in FIG. 5c comprising in addition electric source 8.

Figures 5D, 5E:
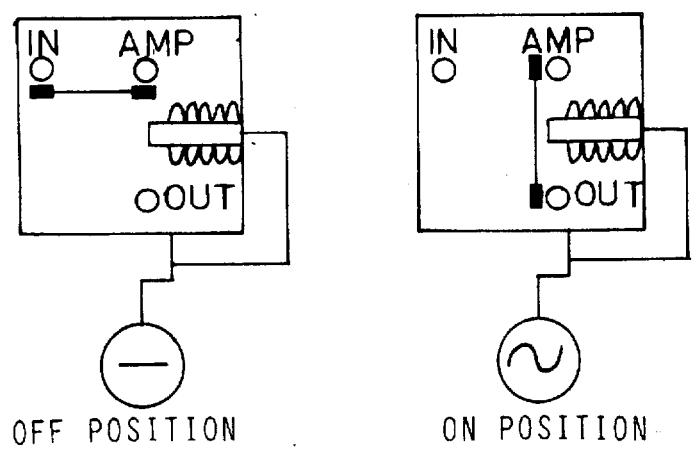
FIG. 5d shows a relay in an one way back-up unit in the "On" and "Off" position.

FIGS. 5d and 5e show an one way back-up unit of the system shown in FIGS. 5a–5c in "on" and "off" positions. (Normal "out" and back-up "in").

Figure 6A:
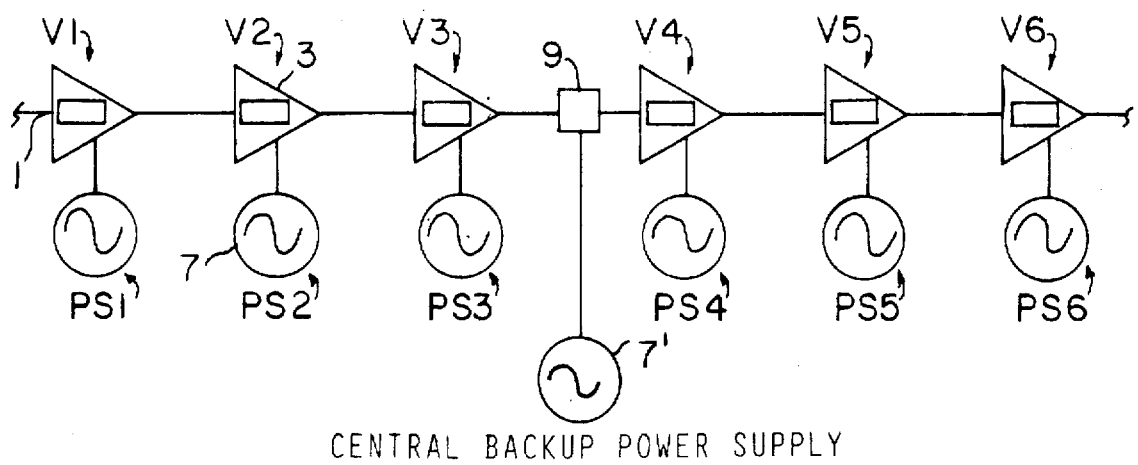
FIG. 6a shows a block diagram of a system 3 according to the present invention.

The system shown in FIG. 6a comprises cable 1 originating in the television station (not shown) connecting Trunks V1–V6 in cascade to each other. Each of said trunks comprises a back-up unit called normal bridger back-up in/out. Each local power supply PS1–PS6 is connected to the corresponding trunk into one of the bridger outputs F1–F6. Power supply 7' is used for back-up only and connected to cable 1 by L.P.I. 9. In order to connect back-up voltage to the two directions of L.P.I. 9 there are present 2 fuses in side said L.P.I.

Figure 6B:
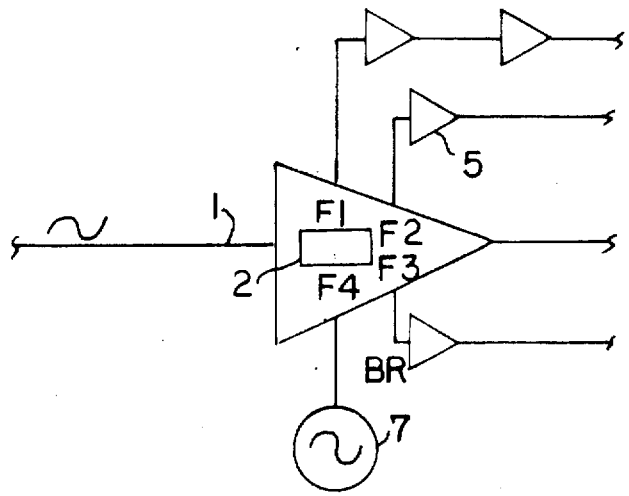

FIG. 6b shows trunk T2 (by way of example only) comprising switching means (relay) 2. Power supply 7 is connected to bridger output F4 (by way of example). Power supply 7 is connected to all lexes 6 being connected to outputs F1, F2 and F3 and to trunk amplifier in truck T2. The back-up power is connected to cable 1. (As in FIG. 6a)

When voltage is inserted into a free bridger-output F1–F4 there is no need to use a L.P.I. 9.

Figure 6C:
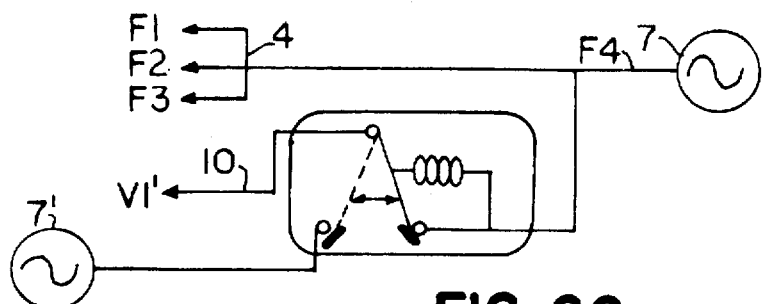
FIG. 6c shows the power way between normal power supply and backup power supply in the system shown in FIGS. 6b and 6c.

FIG. 6c shows the back-up according to the system shown in FIGS. 6a and 6b. Power supply 7' is connected to cable 1 between the trunks (as in FIG. 6a). Power supply 7 is connected to bridger output F4 located in the corresponding trunk. Bridger outputs F1, F2, F3 . . . are connected to lexes 6. V1' shows the input voltage socket supplying power to the trunk amplifier only.

Figure 7A:
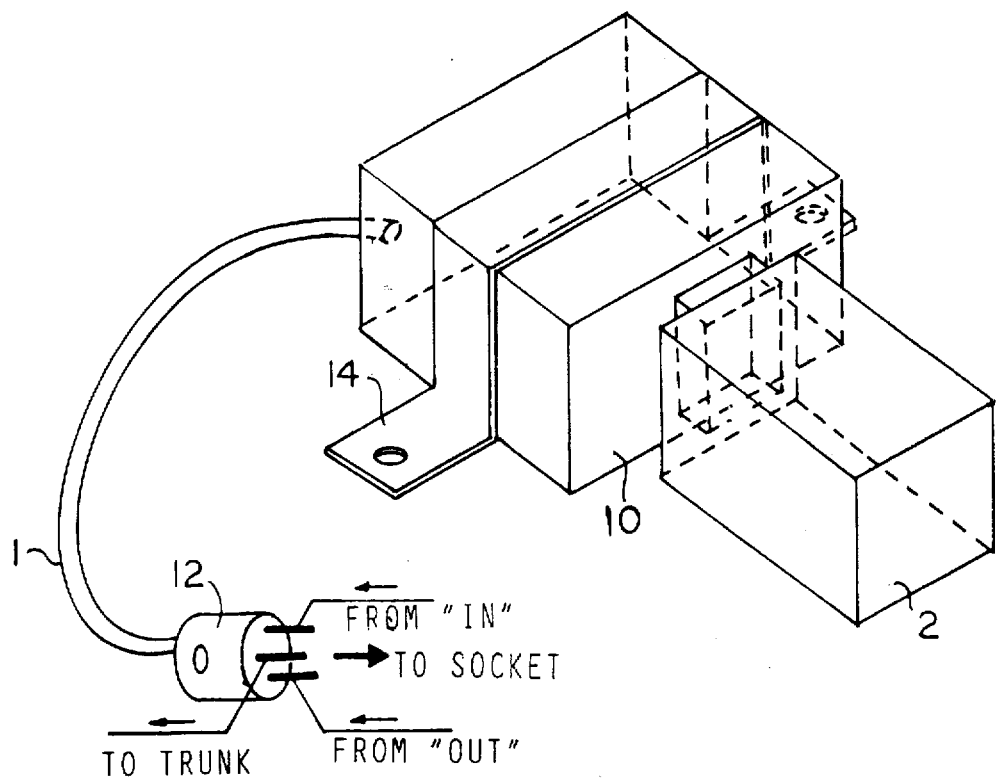
FIG. 7a shows an one way back-up unit for JERROLD trunks.
Figure 7B:
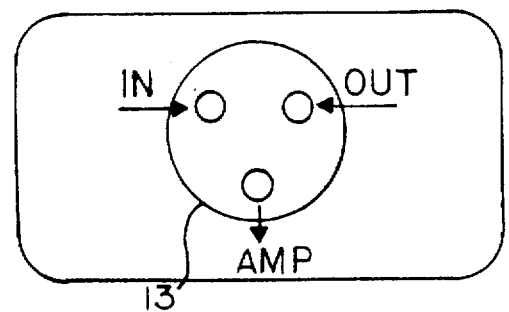
FIG. 7b shows a voltage supply selection socket.

The back-up unit shown in FIGS. 7a and 7b is for a Jerrold trunk. Relay 2 is inserted into housing 10. Cable 11 is inserted by plug 12 into voltage supply selecting socket 13.

The back-up unit shown in FIGS. 8a and 8b is for a Magnavox trunk. Housing A' of relay 2 is connected directly to fuse socket A" of trunk A (not shown). Fuses (F1'–F4') A' are inserted into housing A', instead of original fuses (F1–F4). It is possible to use the original bridger fuse sockets F1–F4 with different kinds of housing A'.

I claim:

1. In a one way back-up system for the supply of electric voltage to main trunk and secondary line extender amplifiers within a television cable system in the case of electricity faults, wherein each main trunk comprises switching means, said switching means switching between two AC voltage sources, one of said AC sources being the local power supply source and the other of said AC sources being the second back-up power supply source positioned from said local power supply source and located near a neighboring trunk amplifier, with said switching means being actuated when an electricity fault occurs in the local power supply source of electricity to said trunk amplifier thereby switching said source of electricity to said trunk amplifier to the other of said AC sources located near a neighboring trunk amplifier having an electrical supply.

2. A system according to claim 1, wherein said switching means is an AC relay.

3. A system according to claim 2, wherein said AC relay is actuated between the range of 48 to 68 V.

4. A system according to claim 1, wherein said switching means is a DC relay connected to a diode bridge.

5. A system according to any of claim 1, wherein the trunk is a MAGNAVOX trunk and the switching means is connected to a fuse terminal.

6. A system according to claim 1, wherein the trunk is a JERROLD trunk and the switching means is connected to a voltage supply selecting socket.

7. A system according to claim 1, wherein said switching means is comprised of more then one switching means.

8. A system according to claim 1, wherein the supply of electric voltage is connected to the switching means via a local power insert.

9. A system according to claim 1, wherein the supply of electric voltage is connected directly to one of the non-used bridgers.

10. A system according claim 1, wherein more than one electric source is connected to the trunk.

11. A system according to claim 1, wherein said cable system includes a plurality of trunks in cascade and is provided with 2 two-way back-up units, said units being located outside and between the last two trunks of the cascade, each unit being connected via an local power insert to a separate trunk and to a separate electric source, said units operating in opposite directions one to another, with each unit comprising an ignition circuit and a maintenance circuit.

12. A system according to claim 11, wherein said ignition circuit comprises a diode and a relay and said maintenance circuit comprises a transformer, diodes and a relay.

13. A back-up system according to claim 1, wherein the switching means is connected to the local electric source and wherein said source of electricity is connected to the input of the trunk amplifier and said back-up supply of electrical voltage is connected to the output of the trunk amplifier.

14. A back-up system according to claim 1, wherein the switching means is connected to the electric source and wherein said local source of electricity is connected to the output of the trunk amplifier and said back-up supply of the electric voltage is connected to the input of the trunk amplifier.

15. A back-up system according to claim 1, wherein the switching means is connected to the local electric source and wherein said source of electricity is connected to one of the bridger outputs of said trunk amplifier and the back-up source originating from the main power line.

16. A system according to claim 1, wherein said cable system includes a plurality of trunks in cascade and is provided with 2 two-way back-up units, said units being located outside and between two or more trunks of the cascade, each unit being connected via a local power insert to a separate trunk and to a separate electric source, said units operating in opposite directions one to another, with each unit comprising an ignition circuit and a maintenance circuit.

17. A system according to claim 1, wherein said switching means is a triak.

18. A system according to claim 1, wherein said switching means is a transistor.

19. A system according to claim 1, wherein the television cable system includes at least one optical receiver backed-up with an external unit.

20. A two-way back-up unit for the supply of electric voltage between a pair of at least two adjacent main trunks and secondary line extender amplifiers within a television cable system when an electrical fault in the local electric supply occurs, wherein each main trunk includes switching means, said switching means switching between two AC voltage sources, one of said AC sources being the local power supply source and the other of said AC sources being the second power supply source positioned from said local power supply source and located near a neighboring trunk, with said switching means being actuated when an electrical fault occurs in said local power supply thereby switching said source of electricity to said trunk to the other of said AC sources and located near a neighboring trunk amplifier having an electrical supply with said unit including an ignition circuit and a maintenance circuit.

21. A unit according to claim 20, wherein the ignition circuit comprises a diode and a relay and the maintenance circuit comprises a transformer, diodes and a relay.

* * * * *